United States Patent [19]

Markfeld et al.

[11] 4,370,896
[45] Feb. 1, 1983

[54] REVERSING DEVICE FOR A GEAR TRANSMISSION

[75] Inventors: Udo Markfeld; Siegfried Wintergerst, both of Friedrichshafen, Fed. Rep. of Germany

[73] Assignee: Zahnradfabrik Friedrichshafen AG, Friedrichshafen, Fed. Rep. of Germany

[21] Appl. No.: 191,023

[22] Filed: Sep. 26, 1980

[30] Foreign Application Priority Data

Sep. 29, 1979 [DE] Fed. Rep. of Germany ....... 2939713

[51] Int. Cl.$^3$ .................. F16H 3/38; F16D 23/06; B60K 41/26

[52] U.S. Cl. .................... 74/339; 74/411.5; 188/70 R; 192/4 C; 192/53 G

[58] Field of Search .................. 74/339, 411.5; 188/70 R; 192/4 A, 4 C

[56] References Cited

U.S. PATENT DOCUMENTS

| | | | |
|---|---|---|---|
| 3,745,847 | 7/1973 | Worner et al. .................. | 74/339 |
| 4,225,024 | 9/1980 | Kuzma .................. | 74/339 X |
| 4,257,284 | 3/1981 | Ashauer et al. .................. | 192/4 C |

Primary Examiner—Allan D. Herrmann
Attorney, Agent, or Firm—Karl F. Ross

[57] ABSTRACT

A transmission has a drive train which is coupled with the engine, e.g. an automotive vehicle and a reversing gear connected to the output shaft. A slidable gear shifted on a fixed shaft, continuously meshes with a gear of the drive train and can be brought into mesh with the reversing gear for reverse drive. According to the invention the shiftable gear is connected with a synchronizing ring which has a frustoconical surface engaging the frustoconical surface of a synchronizing disk which is keyed to the fixed shaft when the slidable gear is shifted toward the reversing gear to stand still. The synchronizing disk or member on the shaft can be entrained with the sliding gear upon overcoming the force of a detent formed by a bore on the fixed shaft which is biased outwardly by a wedge member and an axial spring in the fixed shaft.

11 Claims, 5 Drawing Figures

REVERSING DEVICE FOR A GEAR TRANSMISSION

FIELD OF THE INVENTION

Our present invention relates to a reversing device for a gear transmission and, more particularly, to a system in which a sliding gear can be selectively meshed with or decoupled from a reversing gear connected, for example, to an output shaft of a transmission.

BACKGROUND OF THE INVENTION

Gear transmission, whether for automotive vehicle purposes or other load-driving purposes can be provided between a prime member, such as an internal-combustion engine, and a load such as a power train or wheel-driving system of the vehicle.

Such transmissions can be simple or intricate, but almost invariably will comprise a housing, an input shaft connected to the prime mover, an output shaft connected to the load, and a drive train within the housing for selectively coupling the input shaft to the output shaft with various transmission ratios, depending upon which of the gears of the drive train are in mesh with one another at a particular point in time.

Shifting may be effected by intermediate or other gears of the drive train, by shifting forks or the like, or planetary gearing may be employed in the drive train with individual members of the planetary gear systems being coupled together, immobilized or rendered freewheeling by clutches or brakes, or various gears of the drive train may be coupled to each other or to various shafts by suitable clutches, all depending upon the complexity, the number of transmission ratio steps or ranges desired, etc.

Almost invariably, however, such transmissions include a reversing system whereby, upon actuation of the system, the sense of rotation of the output shaft can be reversed.

The present description is concerned with a reversing system of the type in which the drive train includes at least one drive gear, a reversing gear is provided in the housing and is coupled with the output shaft, e.g. by being fixed thereto, and the reversing system includes a sliding gear which is axially shiftable on a fixed shaft in the housing, while being in mesh with the driving gear so as to engage (mesh with) the reversing gear or disengage from the latter depending upon operation of a reversing continuity such as a fork adapted to shift the slidable gear.

Since the slidable gear is coupled with the drive gear substantially continuously, it is in rotation whenever the drive gear is rotated. Obviously the engagement of a rapidly rotating sliding gear with a stationary reversing gear will pose a problem.

There has thus been proposed (see German patent document-open Application DE-OS No. 27 51 699) a device which is capable of decelerating the sliding wheel, thereby coupling same to engage simply, reliably, quickly and quietly with the reversing gear.

In other words, the decelerating device is designed to reduce the speed or halt the rotation of the sliding gear so that it is practically at standstill when shifted into mesh with the reversing gear.

It is also known to provide, in addition to the decelerating or brake device for the sliding gear, a locking device which operates similarly to a so-called locking synchronization. Such device can be of the ratchet type.

While the system of this reference does not directly connect the sliding gear or wheel continuously with the drive gear or wheel but rather interposes a clutch, it is apparent that the sliding wheel can simply be lengthened to permit continuous drive.

The system of the reference operates reliably and quietly as long as the sliding wheel is at standstill when it engages the ratchet wheel. This condition is generally ensured by the locking device. Nevertheless it is possible to attempt to engage the reversed gear while the vehicle is still in significant motion since deceleration of the sliding wheel cancels out the effect of the locking device. As a result, jerks, shocks or like can be imparted to the drive line or train and the output shaft with concomitant damage to the gear wheels.

OBJECTS OF THE INVENTION

The principal object of the present invention is to provide an improved reversing system for a gear transmission whereby disadvantages of prior-art systems, including those described above, are obviated.

Another object of our invention is to provide a gear transmission having a reversing mode which permits the reversing gears to engage quietly and reliably and which is of low cost and long life.

Still another object of the invention is to provide an improved arrangement of the aforedescribed type, capable of signaling the lack of readiness for a shift into the reversing mode.

It is also an object of this invention to provide a reversing gear arrangement which effectively decelerates the sliding gear in a simple manner to enable complete engagement of the sliding gear with the reversing gear without damage as has occurred in the past because of impacts resulting from incomplete deceleration and rapid vehicle movement.

SUMMARY OF THE INVENTION

These objects and others which will become apparent herein are attained in accordance with the present invention in a gear transmission having a drive train which can be connected with an engine and includes a drive gear, a reversing gear connectable to an output shaft and rotatable in the transmission housing relative to the drive gear, the reversing gear being axially offset from the drive gear, and a slidable gear which is shiftable in the housing, continuously meshes with the drive gear and is engageable upon axial movement on its fixed shaft with the reversing gear.

According to the invention, the sliding gear is fixed axially and rotatably to a synchronizing ring having a frustoconical clutch or braking surface, while a synchronizing disk or member having a complementary frustoconical surface, is rotatably fixed but axially movable on the fixed shaft. The synchronizing disk is held against displacement in the direction of movement of the sliding gear toward the reversing gear (by entrainment of the synchronizing disk with the synchronizing ring) by a detent whose force must be overcome before this entrainment can result in axial displacement of the synchronizing member or disk. Finally, the activator or the sliding gear, i.e. the fork, can be provided with means to disengage the two frustoconical surfaces on completion of the mere shifting operation.

Thus, in normal operation, in the proposed mode, the initial movement of the sliding gear brings the two frustoconical surfaces into frictional engagement while the decelerating or synchronizing member is held against axial displacement by the detent thereby decelerating the sliding gear which is continuously in mesh with the drive gear. When the sliding gear is brought to a standstill, the sliding gear can engage smoothly in the reversing gear.

Naturally, the yieldability of the detent can be adjusted to ensure practically full stop by the driver or vehicle operator.

However, if there is not a full stop, the sliding gear will engage the reversing gear and produce noise which will directly signal the operator that the reverse mode shaft is impeded. With suitable design of the cooperating end faces of the sliding gear and reversing gear, appropriate noises can be generated for signaling purposes without allowing the parts to become damaged. This signaling effect, in combination with the increased resistance to movement of the shifting lever, will suffice to inform the operator that a dangerous condition exists so that corrective action, such as stopping of the vehicle before further shifting, is ensured.

According to a feature of the invention, the means connecting the synchronizing ring to the sliding wheel is releasable to permit replacement of the ring and the latter means advantageously can include a cup-shaped member rigid with a wheel and radially and axially entraining the synchronizing ring. Thr rotational securing means for the latter can include, for example, a radial projection reaching into an opening of the cup while the axial engagement can be provided by a lip of the cup overhanging the ring.

The synchronizing member or disk can be provided with a sleeve which slidably surrounds the fixed shaft and which is rotationally or angularly coupled therewith by a transverse pin which can extend into a slot of the sleeve to prevent relative clear displacement of the sleeve and shaft but which enables axial displacement of the sleeve and shaft.

The detent can include a pair of recesses formed in the disk and adapted to receive balls which are cammed outwardly by the wedge end of a pin axially displaceable in the fixed shaft and biased by a spring which urges the balls outwardly.

Alternatively, the shaft can be splined and the synchronizing member or disk can be axially displaceable but rotationally fixed to the shaft by toothing complementary to the spline.

In place of the balls radiably shiftable pins may be used.

The spring load pin or ball detent of the present invention, the cup-shaped retainer for the ring which can be a simple stamped-out or punched piece, and the like details set forth above provide for a compact simple structure which permits the invention to be applied to existing or prior art transmissions as well as newly constructed transmissions.

Since the path over which the ring entrains the synchronizing member or disk is comparatively long, the separation of the frustoconical surfaces is relative with a slight return movement of the sliding gear or ring since the disk or member is retained under friction against the pins or balls by the spring.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
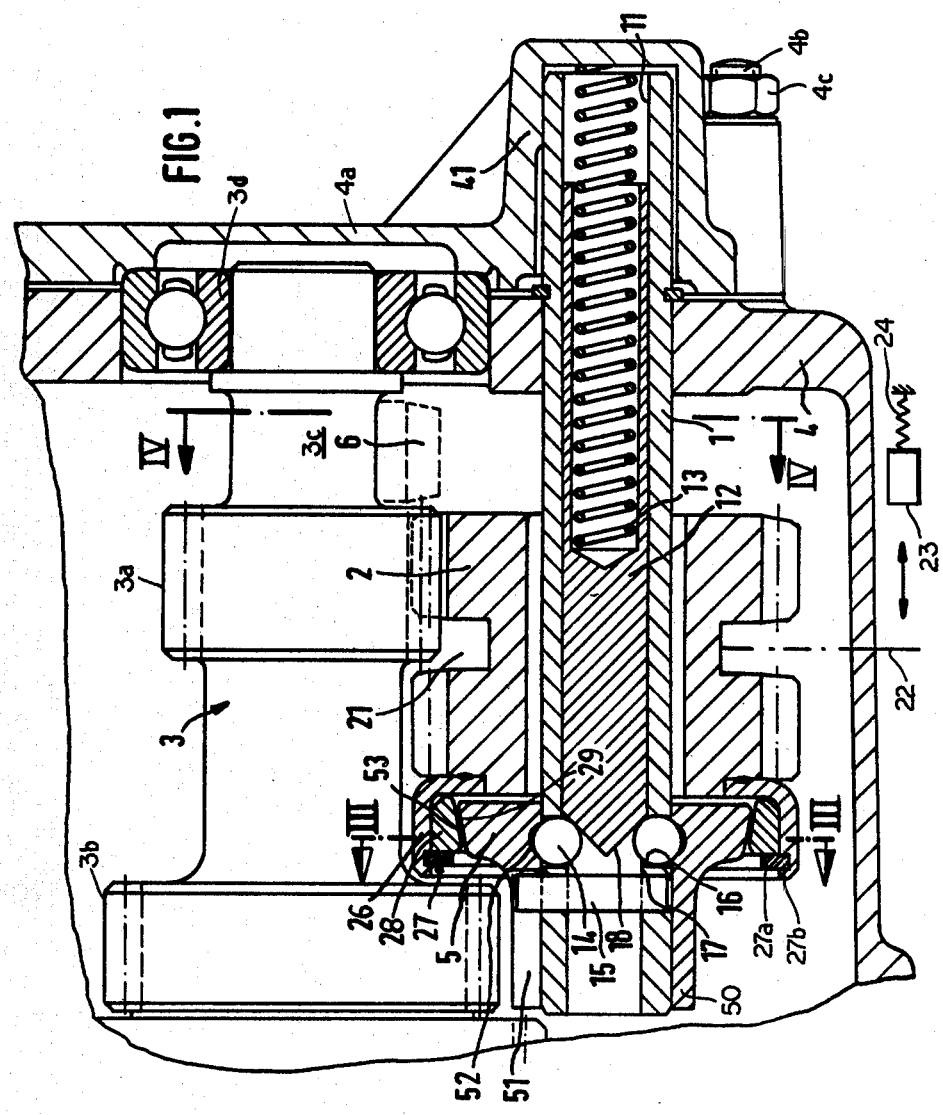
FIG. 1 is a longitudinal axial section with a reversing gear system according to the invention when the sliding gear is not in its reversing mode.

In FIG. 1 we have shown a transmission which comprises a housing 4 and enclosing a drive train represented generally at 3 and including, for example, a drive gear 3a, another gear 3b and a shaft 3c, the latter shown to be journaled at one end in bearing 3d. In this housing, access to the bearing can be had upon removal of the cover 4a which is fixed to the housing 4 by bolts 4b and nuts 4c.

Figure 4:
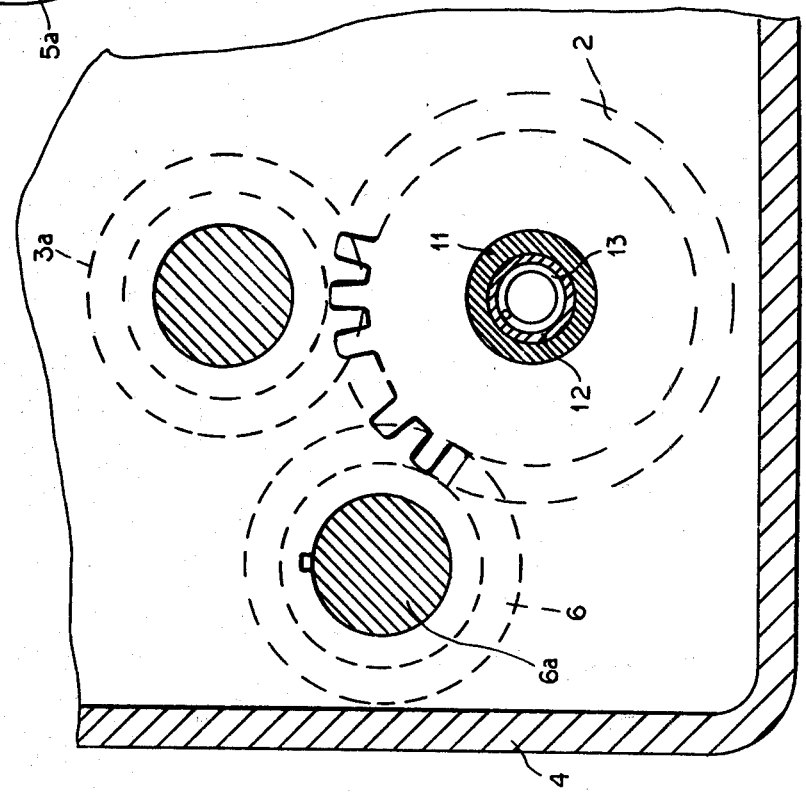
FIG. 4 is a transverse section taken along the line IV—IV of FIG. 1.

The remainder of the drive train has not been illustrated and will of course include an input shaft with gearing to drive the shaft 3c, means for shifting gears into engagement with those of the gear train or otherwise selecting the speeds, and means for connecting the gears to the output shaft. The output shaft has been shown at 6a in FIG. 4 and is keyed to the reversing gear 6 as is also apparent from this figure.

In the reversing system of this invention, a sliding gear 2 continuously engages the drive train 3 by meshing with the gear 3a thereon and is axially shiftable along a shaft 1 which is rigid with the housing.

The shaft 1 has an axially extending longitudinal bore 11 receiving an axially shiftable pin 12 which is biased to the left (FIGS. 1 and 2) by a compression-type coil spring which is seated against a cup-shaped casing 41 of the cover 4a previously described.

The frustoconical or tapered end 18 of the pin 12 forms camming surfaces which wedge apart a pair of diametrically spaced balls 14 passing through holes 16 in the shaft to engage in a groove 52 of a synchronizing member 5 in the form of a disk from which a sleeve 50 axially extends.

Figure 3:
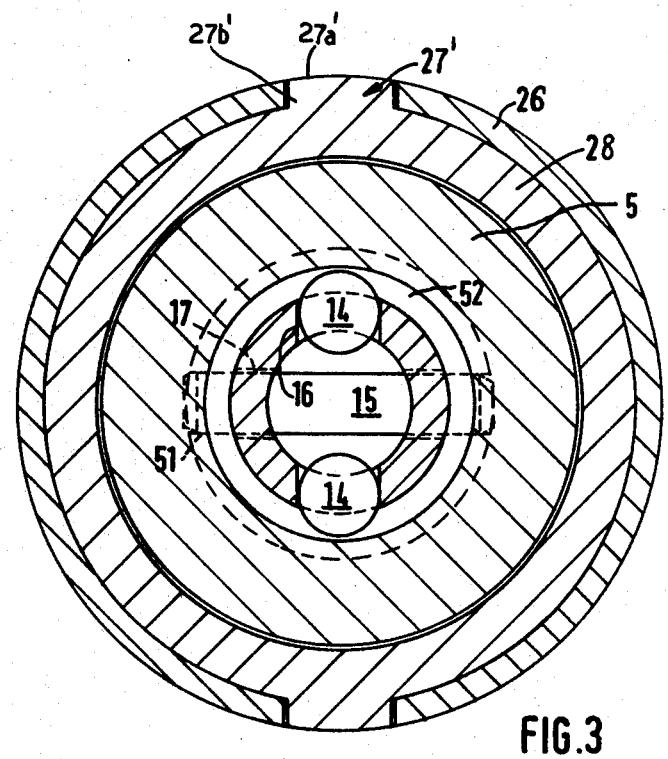
FIG. 3 is a section along the line III—III of FIG. 1.

A pin 15 which has been shown rotated out of position by 90° in FIG. 1 (compare FIG. 3) transverses the shaft 1 and engages in an axially extending longitudinal slot 51 in the sleeve 50 of member 5 thereby rotatably fixing the member 5 to the shaft but allowing axial displacement of this member upon the shaft.

The sliding gear 2 has a groove 21 in which an operating fork can engage. This operating fork is symbolically represented by the dot-dash line 22 in FIG. 1 and can be shifted against a stop 23 which is spring loaded as shown at 24 so that, once the fork is shifted completely to the right in the reversing mode, the spring 24 can return it slightly to the left.

The sliding wheel 2 also carries a cup-shaped member 26 having axial and radial securing means 27 and 27' for engaging a synchronizing ring 28 having a frustoconical surface 29 cooperating with the friction frustocone 53 of synchronizing member 5. The reversing gear wheel has been shown in broken lines in FIGS. 1 and 2.

The radial fixing means 27' can include a pair of diametrically opposite projections 27a' of the ring 28 received in windows 27b' of the cup-shaped member 26.

The axial fixing means 27 can include a spring ring 27a, which is readily removed to release the synchronizing ring 26 and permit its replacement. The ring 27a is lodged beneath an inwardly turned lip 27b of the cup 26.

Figure 2:
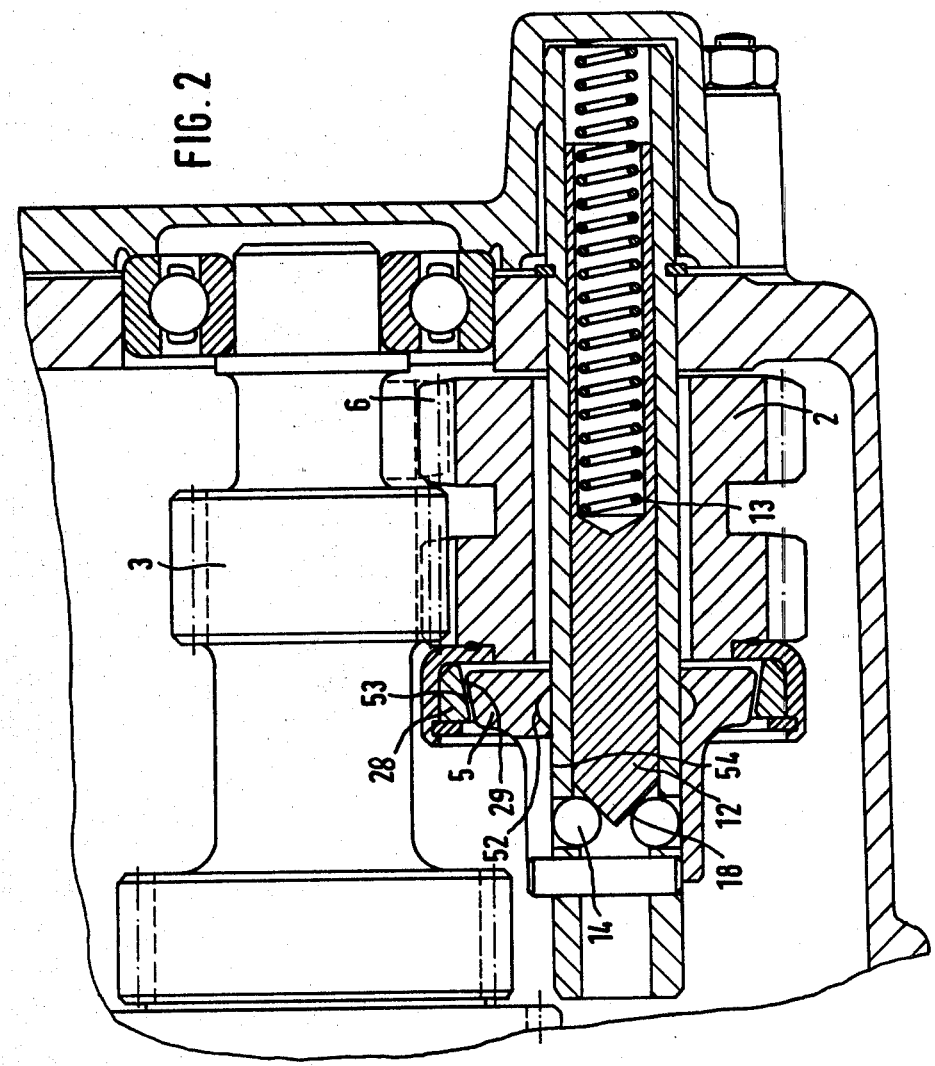
FIG. 2 shows the system of the invention in a view similar to FIG. 1 but with the reversing gear engaged.

The only difference between FIGS. 1 and 2 is that in the latter the reversing gear is engaged while in the former the reversing gear is not engaged and the transmission operates in its usual drive sense.

The actuation of the reverse gear lever (not shown) causes the operating fork 22, which engages the groove 21 of the sliding gear 2 to shift the latter axially to the right (FIG. 1).

The inwardly directed friction cone 29 of the synchronizing ring 26 engages the outwardly turned friction cone on the rotationally fixed member 5 so that the drive train 3, released by the usual clutch from the crankshaft or prime mover is decelerated.

When the vehicle is stationary and hence the reversing gear 6 is not rotating, after the force applied by the detent 14 is overcome, the gear 2 can shift further to the right to mesh with the reversing gear 6 (FIG. 2).

The force of the compression spring 13 can be adjusted by inserting shims between the casing 41 and the end of the spring, to ensure that the resistance of the detent will be sufficient to brake the drive line 3 and gear 2 to zero speed.

When the shifting fork is released, the spring 24 moves the wheel 2 slightly to the left to separate the friction cones 29 and 53. The synchronizing member 5 cannot follow the slide movement to the left because of the friction exerted by the balls 14 upon the sleeve 50. Instead of the stop 23 and the spring 24, a conventional latching means, capable of allowing slight movement to the left of the shifting fork, may be provided, this latching means being released for reverse operation.

When the shifting fork is moved to the left, member 5 is again entrained until the balls 14 engage the groove 52 thereby preventing interengagement of the friction cones 29,53. If, however, the vehicle is still moving forward when the gear 2 is shifted to the right the end faces of gear 2 and 6 will contact one another to produce a noise and thereby warn the driver. This warning operation is augmented by the force applied by the balls 14. The end faces of gears 2 and 6 can be designed to increase the noise generated if desired.

Figure 5:
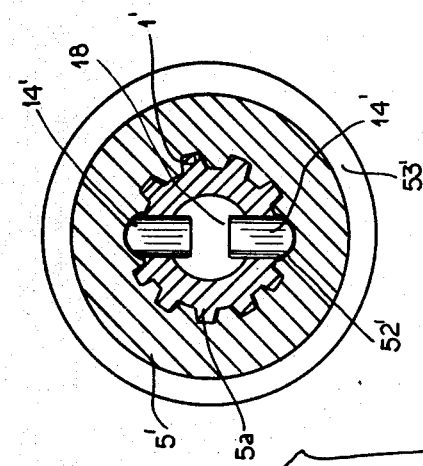
FIG. 5 is a further transverse section illustrating a modification of the invention.

In FIG. 5 we have shown another embodiment wherein the sleeve and disk of member 5' (synchronizing disk) are internally toothed at 5a' to engage splines 1' of the shaft, thereby preventing relative rotation of the shaft and this member, but allowing the relative axial displacement. In this embodiment as well, the camming end 18 of the pin 12 urges detent pins 14' outwardly into notches 52 of member 5'. Otherwise the system operates and is constructed in a manner similar to that of FIGS. 1 through 4.

We claim:

1. In a transmission having a housing, a drive train in said housing including a drive gear, a fixed shaft in said housing, an output shaft extending into said housing, a reversing gear connectible with said output shaft, and a sliding gear rotatable and axially shiftable on said fixed shaft and movable into and out of mesh with said reversing gear while continuously meshing with said drive gear, the improvement which comprises:
    a synchronizing ring axially and rotationally fixed to said sliding gear;
    a synchronizing member rotationally fixed to said fixed shaft but axially shiftable thereon and frictionally engageable with said retaining ring to brake rotation of said sliding gear;
    detent means on said shaft impeding axial entrainment of said member with said ring upon movement of said sliding gear toward meshing engagement with said reversing gear; and
    means for discontinuing frictional engagement between said ring and said member upon movement of said sliding gear into mesh with said reversing gear.

2. The improvement defined in claim 1, further comprising means for releasably connecting said ring to said sliding gear.

3. The improvement defined in claim 2 wherein said means for releasably connecting said ring to said sliding gear is a cup fixed to said sliding gear and receiving said ring.

4. The improvement defined in claim 1 wherein said member is provided with an axial slot and said fixed shaft is formed with a transverse pin engaging in said slot and preventing rotation of said member while allowing axial displacement thereof on said fixed shaft.

5. The improvement defined in claim 1 wherein said fixed shaft and said member are provided with complementary toothing enabling axial displacement of said member and said fixed shaft but preventing rotation of said member relative to said fixed shaft.

6. The improvement defined in claim 1 wherein said detent means includes a plurality of elements mounted in said fixed shaft and biased resiliently outwardly.

7. The improvement defined in claim 6 wherein said fixed shaft is hollow and receives a compression spring and a camming pin displaceable axially by said spring and biasing said elements outwardly.

8. The improvement defined in claim 7 wherein said camming pin has a conical or spherical surface camming said elements outwardly.

9. The improvement defined in claim 8 wherein said elements are balls.

10. The improvement defined in claim 8 wherein said elements are pins.

11. The improvement defined in claim 1 wherein the synchronizing ring is disengaged from said member after engagement of said sliding gear with said reversing gear by dimensioning the operating travel of said sliding gear to be greater then the travel of an operating linkage for said sliding gear necessary to bring said sliding gear into engagement with said reversing gear.

* * * * *